United States Patent
Chen

(10) Patent No.: US 8,908,501 B2
(45) Date of Patent: Dec. 9, 2014

(54) PROCEDURES FOR FINDING A BACKUP INGRESS OF A POINT-TO-MULTIPOINT LABEL SWITCHED PATH

(75) Inventor: Huaimo Chen, Bolton, MA (US)

(73) Assignee: Futurewei Technologies, Inc., Plano, TX (US)

(*) Notice: Subject to any disclaimer, the term of this patent is extended or adjusted under 35 U.S.C. 154(b) by 258 days.

(21) Appl. No.: 13/549,234

(22) Filed: Jul. 13, 2012

(65) Prior Publication Data
US 2013/0016605 A1     Jan. 17, 2013

Related U.S. Application Data

(60) Provisional application No. 61/508,463, filed on Jul. 15, 2011.

(51) Int. Cl.

| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 12/703* | (2013.01) |
| *H04L 12/751* | (2013.01) |
| *H04L 12/707* | (2013.01) |
| *H04L 12/723* | (2013.01) |

(52) U.S. Cl.
CPC .............. *H04L 45/28* (2013.01); *H04L 45/02* (2013.01); *H04L 45/22* (2013.01); *H04L 45/50* (2013.01)

USPC .......... 370/217; 370/221; 370/232; 370/236; 370/395.31

(58) Field of Classification Search
USPC ......... 370/217, 220, 221, 232, 236, 255, 332, 370/395.31, 408
See application file for complete search history.

(56) References Cited

U.S. PATENT DOCUMENTS

2007/0201355 A1*  8/2007  Vasseur et al. ................ 370/217
(Continued)

OTHER PUBLICATIONS

Farrel, et al., "A Path Computation Element (PCE)—Based Architecture," RFC 4655, Aug. 2006, 40 pages.

(Continued)

*Primary Examiner* — Benjamin H Elliott, IV
(74) *Attorney, Agent, or Firm* — Conley Rose, P.C.; Gary Rodolph; William H. Dietrich

(57) ABSTRACT

A method comprising receiving a request from a network component to find a backup ingress node for an ingress node of a point-to-multipoint (P2MP) label switched path (LSP), determining a plurality of candidate backup ingress nodes that satisfy a plurality of constraints, including being an edge node in the ingress node's domain and having a direct link to the ingress node, a path to each next hop node of the ingress node of the P2MP LSP, and a path from a source node that communicates with the ingress node, wherein the determination is in response to receiving the request, selecting the backup ingress node from the candidate backup ingress nodes that has a minimum cost of paths from the source node to the next hop nodes via the backup ingress node; and sending a reply to the network component that indicates the selected backup ingress node.

17 Claims, 9 Drawing Sheets

(56) References Cited

U.S. PATENT DOCUMENTS

| | | | |
|---|---|---|---|
| 2008/0219272 A1* | 9/2008 | Novello et al. | 370/401 |
| 2009/0182894 A1* | 7/2009 | Vasseur et al. | 709/239 |
| 2010/0146149 A1* | 6/2010 | Vasseur et al. | 709/239 |
| 2010/0177631 A1* | 7/2010 | Chen et al. | 370/221 |
| 2011/0019674 A1* | 1/2011 | Iovanna et al. | 370/392 |
| 2011/0211445 A1 | 9/2011 | Chen | |
| 2013/0016605 A1* | 1/2013 | Chen | 370/221 |

OTHER PUBLICATIONS

Aggarwal., Ed, et al., "Extensions to Resource Reservation Protocol—Traffic Engineering (RSVP-TE) for Point-to-Multipoint TE Label Switched Paths (LSPs)," RFC 4875, May 2007, 54 pages.

Zhao, Ed., et al., "Extensions to the Path Computation Element Communication Protocol (PCEP) for Point-to-Multipoint Traffic Engineering Label Switched Paths," RFC 6006, Sep. 2010, 34 pages.

* cited by examiner

PROCEDURES FOR FINDING A BACKUP INGRESS OF A POINT-TO-MULTIPOINT LABEL SWITCHED PATH

CROSS-REFERENCE TO RELATED APPLICATIONS

The present application claims the benefit of U.S. Provisional Patent Application No. 61/508,463 filed Jul. 15, 2011 by Huaimo Chen and entitled "Procedures for Finding a Backup Ingress of a Point-to-Multipoint Label Switched Path," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In some networks, such as Multiprotocol Label Switching (MPLS) networks and Generalized MPLS (GMPLS) networks, a Traffic Engineering (TE) Label Switched Path (LSP) can be established using a Resource Reservation Protocol-TE (RSVP-TE) for a given path. A path can be provided by a Path Computation Client (PCC) and/or a Path Computation Element (PCE). For example, the PCC may request a path or route from the PCE, which computes the path and forwards the computed path information back to the PCC. The path can be a point-to-point (P2P) path, which comprises a plurality of nodes and/or Label Switch Routers (LSRs) and extends from a source node or LSR to a destination node or LSR. Alternatively, the path can be a Point-to-Multipoint (P2MP) path that extends from the source node to a plurality of destination nodes. The RSVP-TE can also be used to establish backup P2P and P2MP LSPs to reroute packets during network link or internal node failures and thus guarantee packet delivery.

The Internet Engineering Task Force (IETF) Request for Comments (RFC) 4655 entitled "A Path Computation Element (PCE)-Based Architecture", which is incorporated herein by reference, describes a set of building blocks for constructing solutions to compute a path for a P2P TE LSP across multiple areas or Autonomous System (AS) domains. A typical PCE-based system comprises one or more path computation servers, traffic engineering databases (TED), and a number of PCCs. The routing protocol is used to exchange traffic engineering information from which the TED is constructed. A PCC sends a path computation request for a P2P TE LSP to the path computation server, which uses the TED to compute the path and responds to the PCC with the computed path. A path computation server may be referred to as a PCE, or a PCE may be an application running on a server. The communications between a PCE and a PCC for P2P LSP path computations follow the PCE communication protocol (PCEP).

The IETF RFC 4875 entitled "Extensions to Resource Reservation Protocol—Traffic Engineering (RSVP-TE) for Point-to-Multipoint TE Label Switched Paths", which is incorporated herein by reference, describes a mechanism for setting up P2MP traffic engineering label switched paths. A P2MP LSP is comprised of multiple Source-to-Leaf (S2L) sub-LSPs. These S2L sub-LSPs are set up between the ingress and egress LSRs and are appropriately combined by the branch LSRs using Resource Reservation Protocol (RSVP) semantics to result in a P2MP TE LSP.

The IETF RFC 6006 entitled "Extensions to the Path Computation Element Communication Protocol (PCEP) for Point-to-Multipoint Traffic Engineering Label Switched Paths", which is incorporated herein by reference, describes extensions to the PCEP to handle requests and responses for the computation of a path for a P2MP TE LSP crossing multiple domains. A mechanism for a PCC to send a request for computing a backup ingress for a P2MP LSP to a PCE and for a PCE to reply to the PCC with a computation result for the backup ingress is described in U.S. patent application Ser. No. 13/033,125 filed Feb. 23, 2011 by Huaimo Chen and entitled "System and Method for Computing a Backup Ingress of a Point-to-Multipoint Label Switched Path", which is incorporated herein by reference as if reproduced in its entirety.

However, no procedure for finding a backup ingress of a P2MP TE LSP and a backup path from the backup ingress to the next-hop nodes of the ingress node of the LSP is described in any of the documents mentioned above. There is thus a need for efficient procedures for finding a backup ingress for a P2MP TE LSP, a backup path from the backup ingress to the next-hop nodes of the ingress node of the LSP, and a path from a source node to the backup ingress node.

SUMMARY

In one embodiment, the disclosure includes a method implemented by a network component, the method comprising receiving a request from a second network component to find a backup ingress node for an ingress node of a P2MP LSP, determining a plurality of candidate backup ingress nodes that satisfy a plurality of constraints, including being an edge node in the ingress node's domain and having a direct link to the ingress node, a path to each next hop node of the ingress node of the P2MP LSP, and a path from a source node that communicates with the ingress node, wherein the determination is in response to receiving the request, selecting the backup ingress node from the candidate backup ingress nodes that has a minimum cost of paths from the source node to the next hop nodes via the backup ingress node, and sending a reply to the second network component that indicates the selected backup ingress node.

In another embodiment, the disclosure includes a method implemented by a network component in a network, the method comprising receiving a request from a PCC to find a backup ingress node for an ingress node of a P2MP LSP, determining a plurality of candidate backup ingress nodes that are edge nodes directly coupled to the ingress node and that each has a plurality of paths to a plurality of next hop nodes of the ingress node of the P2MP LSP, sending the candidate backup ingress nodes to a second network component, receiving a subset of the candidate backup ingress nodes from the second network component to each of which there is a path from a source node that communicates with the ingress node, selecting the backup ingress node from the subset of candidate backup ingress nodes that has a minimum cost of paths from the source node to the next hop nodes via the backup ingress node, and sending a reply to the PCC that indicates the selected backup ingress node.

In another embodiment aspect, the disclosure includes an apparatus comprising a PCE configured to receive a request from a PCC to find a backup ingress node for an ingress node of a P2MP LSP, find a plurality of candidate backup ingress nodes that are edge nodes directly coupled to the ingress node and that each has a plurality of paths to a plurality of next hop nodes of the ingress node on the P2MP LSP, send the candidate backup ingress nodes to a second PCE, receive a subset of the candidate backup ingress nodes from the second PCE to each of which there is a path from a source node that communicates with the ingress node, select the backup ingress node from the subset of candidate backup ingress nodes that has a minimum cost of paths from the source node to the next hop nodes via the backup ingress node, and send a reply to the PCC that indicates the selected backup ingress node.

In another embodiment, the disclosure includes a method implemented by a PCE in a network, the method comprising receiving a request from a second PCE to find a backup ingress node for an ingress node of a P2MP LSP, wherein the request comprises information about the P2MP, the ingress node, and constraints for finding the backup ingress node, finding a plurality of candidate backup ingress nodes that are edge nodes of a first domain of the ingress node and that to each of the edge nodes there is a path from a source node that communicates with the ingress node in a second domain, and sending the candidate backup ingress nodes to the second PCE.

In yet another embodiment, the disclosure includes a network component comprising a PCE configured to receive a request from a second PCE to find a backup ingress node for an ingress node of a P2MP LSP, wherein the request comprises information about the P2MP LSP, the ingress node, and constraints for finding the backup ingress node, find a plurality of candidate backup ingress nodes that are edge nodes of a first domain of the ingress node and that to each of the edge nodes there is a path from a source node that communicates with the ingress node in a second domain, and send the candidate backup ingress nodes to the second PCE These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
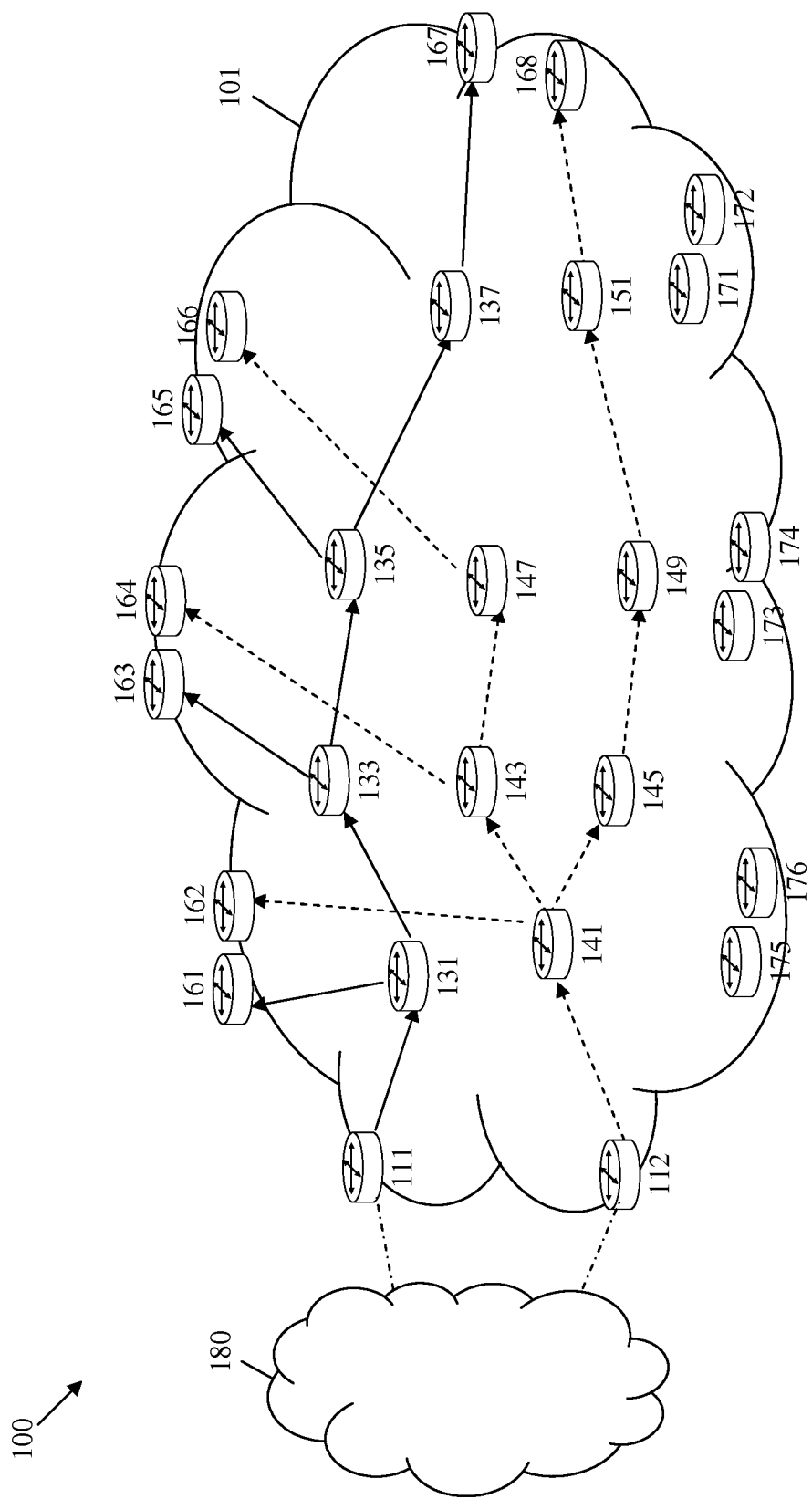
FIG. 1 is a schematic diagram of a label switched system that uses a backup P2MP LSP to protect a primary P2MP LSP.

FIG. 1 illustrates a label switched system 100, where a plurality P2MP LSPs may be established between at least some of the components. The P2MP LSPs may be used to transport data traffic. The label switched system 100 may comprise a label switched network 101, which may be a packet switched network that transports data traffic using packets or frames along network paths or routes. The packets may be routed or switched along the paths, which may be established by a label switching protocol, such as MPLS or GMPLS.

The label switched network 101 may comprise a plurality of edge nodes, including a first ingress node 111, a second ingress node 112, a plurality of first egress nodes 161, 163, 165, 167, 171, 173 and 175, and a plurality of second egress nodes 162, 164, 166, 168, 172, 174 and 176. When a P2MP LSP in the label switched network 101 comprises at least some of the edge nodes, the first ingress node 111 and second ingress node 112 may be referred to as root nodes, and the first egress nodes 161, 163, 165, 167, 171, 173 and 175 and second egress nodes 162, 164, 166, 168, 172, 174 and 176 may be referred to as leaf nodes or destination nodes. Additionally, the label switched network 101 may comprise a plurality of internal nodes 131, 133, 135, 137, 141, 143, 145, 147, 149 and 151, which may communicate with one another and with the edge nodes. The first ingress node 111 and the second ingress node 112 may communicate with a first external network 180, such as an Internet protocol (IP) network, which may be coupled to the label switched network 101. As such, the first ingress node 111 and the second ingress node 112 may transport data, e.g., data packets, between the label switch network 101 and the external network 180. Further, some of the first egress nodes and second egress nodes may be grouped in pairs, for example, the first egress node 161 and the second egress node 162 are grouped in a pair, where each pair may be coupled to a second external network or a client (not shown).

In an embodiment, the edge nodes and internal nodes may be any devices or components that support transportation of the packets through the label switched network 101. For example, the network nodes may include switches, routers, or various combinations of such devices. The network nodes may receive packets from other network nodes, comprise logic circuitry that determines which network nodes to send the packets to, and transmit the packets to the other network nodes. In some embodiments, at least some of the network nodes may be label switched routers (LSRs), which may be configured to modify or update the labels of the packets transported in the label switched network 101. Further, at least some of the edge nodes may be label edge routers (LERs), which may be configured to insert or remove the labels of the packets transported between the label switched network 101 and the external network 180.

The label switched network 101 may comprise a first P2MP LSP, which may be established to multicast data traffic from the first external network 180 to the second external networks or clients. The first P2MP LSP may comprise the first ingress node 111 and at least some of the first egress nodes. The first P2MP LSP is shown using solid arrow lines in FIG. 1. To protect the first P2MP LSP against link or node failures, the label switched network 101 may comprise a second P2MP LSP, which may comprise the second ingress node 112 and at least some of the second egress nodes. Specifically, each of the second egress nodes may be paired with a first egress node of the first P2MP LSP. The second P2MP LSP may also comprise the same and/or different internal nodes. The second P2MP LSP may provide a backup path to the first P2MP LSP and may be used to forward traffic from the first external network 180 to the second external networks or clients when the ingress node or any egress node of first P2MP LSP fails. The second P2MP LSP is shown using dashed arrow lines in FIG. 1.

Reserving a second P2MP LSP as a backup path to the first P2MP LSP may be resource consuming since the second P2MP LSP may require additional network bandwidth, which may be comparable to the reserved bandwidth of the first P2MP LSP. Further, when the ingress node of the first P2MP LSP fails, rerouting traffic via a corresponding second P2MP LSP may cause a delay in traffic delivery. Even when the second P2MP LSP carries in parallel (e.g., at about the same time) the same traffic as the first P2MP LSP, when the ingress node of the first P2MP LSP fails, the delay for a second external network or a client to determine the failure and switch to a second egress node for receiving the traffic may be long. Such delay may not be acceptable in some systems, e.g., for real time services such as IP television (IPTV).

To reduce network resource and backup reroute time or delay, a protection scheme for locally protecting the ingress node of the original P2MP LSP may be implemented. Specifically, the ingress node may be protected by a backup ingress node that may be directly coupled to the ingress node and a backup sub-tree for the P2MP LSP that couples the backup ingress node to the P2MP LSP. The backup ingress node and the backup sub-tree for the P2MP LSP may allow traffic to bypass the ingress node, such as when the ingress node or a link of the ingress node fails. Provisioning a backup ingress node and a backup sub-tree for the P2MP LSP instead of using a second P2MP LSP for backup may use less network resources and reduce backup reroute time.

Disclosed herein are systems, apparatuses, and methods for finding a backup ingress node for a P2MP TE LSP. The methods may be implemented by different PCEs in the system, which may communicate and work together to find the find a backup ingress node for an established ingress node of the P2MP TE LSP. When a first PCE responsible for a first domain comprising the ingress node of the P2MP TE LSP receives a request message (e.g., from a PCC) for finding a backup ingress node for the P2MP TE LSP, the first PCE may find the backup ingress by implementing a number of steps. In a first step, the first PCE may attempt to find a list of candidate backup ingress nodes in the domain. This first step may comprise two stages. At a first stage, the first PCE may attempt to find a list of pre-candidate backup ingress nodes, where each node in the list satisfies constraints determined for a backup ingress node to the ingress node of the P2MP LSP. At a second stage, the first PCE may construct a list of candidate backup ingress nodes from the list of pre-candidate backup ingress nodes, where for each node N (N is an integer index of nodes) in the list of the candidate backup ingress nodes, there is a path from N to the next-hop nodes of the ingress node of the P2MP LSP that satisfies the constraints and does not comprise any node or link on the P2MP LSP.

After the first PCE establishes the list of candidate backup ingress nodes, the first PCE may construct and send a request message to a second PCE responsible for a second domain (coupled to the first domain) that comprises a source node from which the traffic is transmitted to the ingress node of the P2MP TE LSP. The request message may comprise the established list of candidate backup ingress nodes, a path from each of the candidate backup ingress nodes to the next-hop nodes of the ingress of the P2MP LSP, and constraints for the backup ingress node.

When the second PCE responsible for the second domain comprising the source node receives the request message from the first PCE responsible for the first domain comprising the ingress of the P2MP LSP, the second PCE may attempt to find a list of post-candidate backup ingress nodes from the list of candidate backup ingress nodes included in the request message. For each candidate backup ingress node N in the request message, an attempt to find a path from the source node to node N that satisfies the constraints may be made. If the path is found, then the node N may be added to the list along with the path found. If a non-empty list of post-candidate backup ingress nodes is obtained, the second PCE may construct and send a reply message with the list of post-candidate backup ingress nodes and their paths to the first PCE responsible for the first domain comprising the ingress node of the P2MP LSP.

In a second step, when the first PCE responsible for the first domain comprising the ingress of the P2MP LSP receives the reply message from the second PCE responsible for the second domain comprising the source node, the first PCE may select a backup ingress node from the list of post-candidate backup ingress nodes included in the reply message. For each post-candidate backup ingress node and the associated path from the source node to that post-candidate backup ingress node in the received reply message, a path from the source node to the next-hop nodes of the ingress of the P2MP LSP may be calculated, and the post-candidate backup ingress node with the path having the minimum cost among the paths may be selected as the backup ingress node. After the backup ingress node is found, the first PCE may construct and send a reply message with the backup ingress node and the associated backup path information to the PCC from which the request was received.

In another embodiment, when a first PCE responsible for a first domain comprising the ingress node of a P2MP TE LSP receives a request message (from a PCC) for finding a backup ingress node for the LSP, the backup ingress node may be computed in the following steps. At a first step, the first PCE may send a request message for finding the backup ingress node to a second PCE responsible for a second domain (coupled to the first domain) comprising a source node from which the traffic is transmitted to the ingress node of the LSP.

In a second step, the second PCE may receive the request message from the first PCE. The second PCE may attempt to find a list of pre-candidate backup ingress nodes, where for each node N in the list, there is a path from the source node to node N that satisfies the constraints and where node N is a border node of the first domain comprising the ingress node. After the list is found, the second PCE may construct and send a reply message to the first PCE with the list of pre-candidate backup ingress nodes and the path from the source node to each node in the list.

In a third step, the first PCE may receive the reply message from the second PCE. The first PCE may attempt to find a list of candidate backup ingress nodes from the list of pre-candidate backup ingress nodes, where each node N in the list satisfies the constraints for a backup ingress node to the ingress node of the P2MP LSP, and where there is a path from node N to the next-hop nodes of the ingress node of the P2MP LSP that satisfies the constraints and may not comprise any node or link on the P2MP LSP.

In a fourth step, after the first PCE has the list of candidate backup ingress nodes, the first PCE may select a node N from the list as the backup ingress node, where there is a path from the source node to the next-hop nodes of the ingress node of the P2MP LSP through node N with the minimum cost. The first PE may construct and send a reply message with the selected backup ingress node and the associated backup path information to the PCC from which the request was received.

Figure 2:
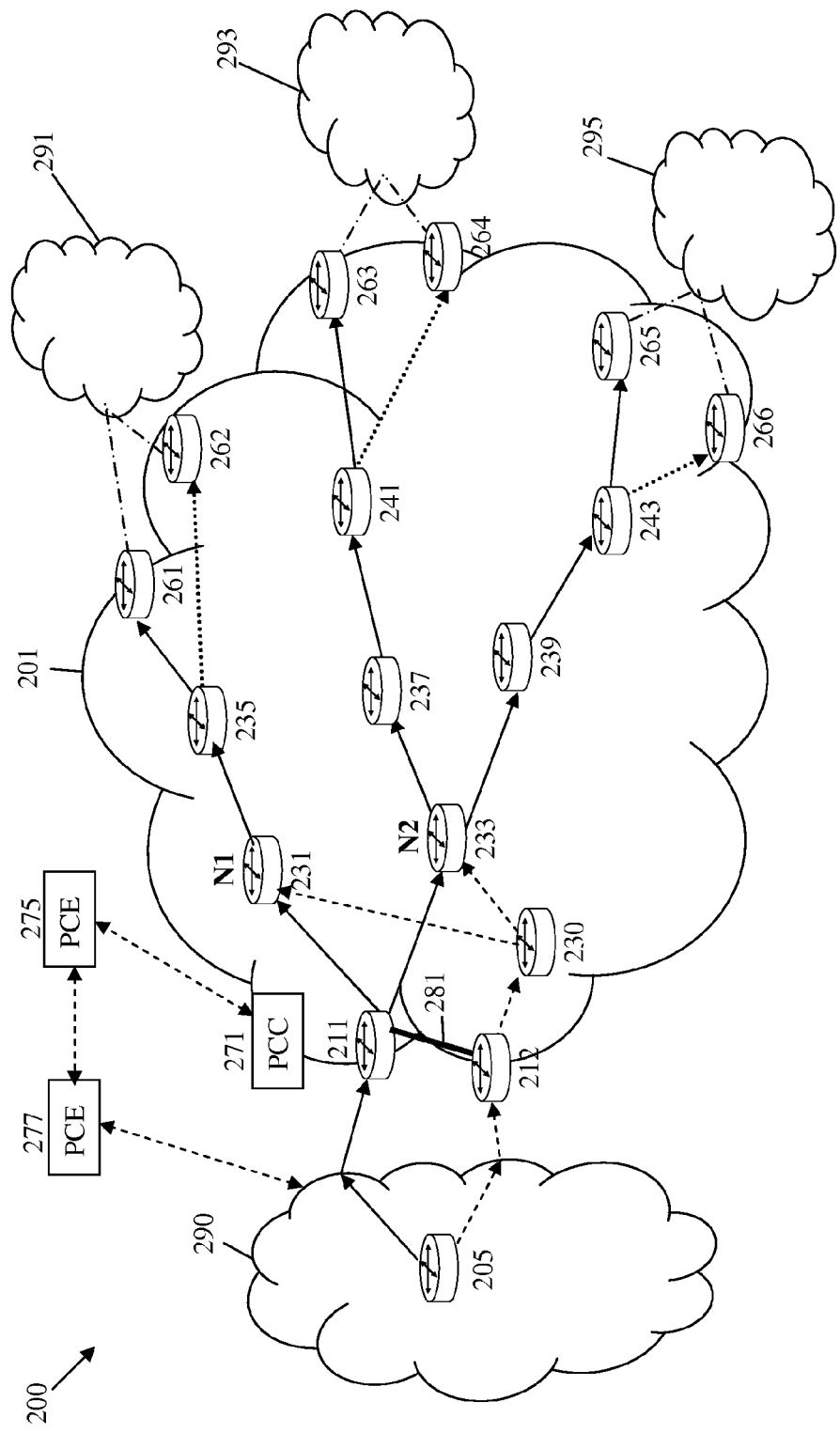
FIG. 2 is a schematic diagram of a label switched system that uses a backup ingress node and a backup sub-tree to protect a P2MP LSP according to an embodiment of the disclosure.

FIG. 2 illustrates one embodiment of another label switched system 200, where a plurality of TE LSPs may be established between at least some of the components. The label switched system 200 may comprise a label switched network 201, which may be a packet switched network. The label switched network 201 may comprise a plurality of edge nodes, which may comprise a first ingress node 211, a second ingress node 212, a plurality of first egress nodes 261, 263, 265 and a plurality of second egress nodes 262, 264, 266. Additionally, the label switched network 201 may comprise a plurality of internal nodes 230, 231, 233, 235, 237, 239, 241 and 243, which may communicate with one another and with the edge nodes. The label switched system 200 is used for illustrative purposes and the features designed herein apply to label switched systems with an arbitrary number of nodes connected in an arbitrary way.

The label switch network 201 may communicate with a first external network 290 via the first ingress node 211 and the second ingress node 212, and with a plurality of second external networks 291, 293 and 295 via the first egress nodes 261, 263, 265 and the second egress nodes 262, 264 and 266. Specifically, the label switch network 201 may communicate with each of the second external networks via a pair of a first egress node such as the first egress node 261 and a second egress node such as the egress node 262. Alternatively, the first egress node such as the first egress node 261 and second egress node such as the egress node 262 may communicate with a client.

The label switched network 201 may comprise a P2MP LSP (indicated by solid arrow lines), which may be established to multicast data traffic from the first external network 290 to the second external networks 291, 293 and 295, or alternatively to clients coupled to the label switched network 201. The P2MP LSP may comprise the first ingress node 211 and at least some of the first egress nodes. The P2MP LSP may also comprise a plurality of internal nodes. In an embodiment, the second ingress node 212 may be designated as a backup node for the first ingress node 211 to protect the P2MP LSP against ingress node failure. Accordingly, the second ingress node 212 may be configured to communicate with the first ingress node 211 to establish a backup sub-tree (indicated by dashed arrow lines) for the P2MP LSP to protect the first ingress node 211. When the first ingress node 211 fails or the link between the first ingress node 211 and the external network 290 fails, the backup ingress node (e.g., the second ingress node 212) may reroute packets to be sent to the first ingress node 211 (from the source node 205) and to be transported by the P2MP LSP via the backup sub-tree for the P2MP LSP and then subsequently the packets are merged into the P2MP LSP at the next hop nodes (e.g., the next hop nodes 231 and 233).

The second ingress node 212 may be computed or selected using a first PCE 275 and a second PCE 277, for instance based on network topology information. The first PCE 275 may be designated for calculating paths for TE LSPs or paths for the label switched network 201 and the second PCE 277 may be designated for calculating paths for TE LSPs or paths for the first external network 290. A PCC 271 may send a request for computing a backup ingress to the first PCE 275, which may communicate with the second PCE 277 to compute the backup ingress and a backup sub-tree for the P2MP LSP and send a reply to the PCC 271. The PCC 271 may be on the ingress node 211 or any other node of the label switched network 201. Thus, the first PCE 275 may inform the first ingress node 211 of the selected second ingress node 212. The first PCE 275 and the second PCE 277 may compute the backup ingress and the backup sub-tree for the P2MP LSP, which may include a path from the source node 205 to the backup ingress, based on constraints (and network topology information) as described below.

After selecting the second ingress node 212 as a backup node for the first ingress node 211, the second ingress node 212 may be configured to detect a failure in the first ingress node 211 using a failure detection mechanism. For instance, the failure detection mechanism may be a Bi-directional Forwarding Detection (BFD) over an interface 281 or a P2P LSP, which may be established between the first ingress node 211 and the second ingress node 212. The interface 281 may be established over a direct link between the first ingress node 211 and the second ingress node 212. When the second ingress node 212 detects a failure in the first ingress node 211, the second ingress node 212 may receive the traffic, e.g., from the source node 205 in the first external network 290, and then forward the traffic via the backup sub-tree for the P2MP LSP to the next-hop nodes of the ingress node of the P2MP LSP. The traffic may then be merged into the P2MP LSP at the next-hop nodes. In an embodiment, if the traffic is initially received by both the first ingress node 211 and the second ingress node 212 in parallel, then the second ingress node 212 may also forward the traffic via the backup P2MP sub-tree to the next-hop nodes of the first ingress node of the P2MP LSP upon detecting a failure in the first ingress node 211.

In some scenarios, at least some of the second egress nodes such as the egress node 262, which may be paired with the first egress nodes such as the first egress node 261, may be designated as backup nodes for the first egress nodes to protect against egress node failure. Accordingly, a previous-hop node that may precede a first egress node such as the first egress node 261 along the P2MP LSP may be configured to receive information about a second egress node such as the second egress node 262, establish a backup LSP (indicated by a dotted arrow line) for the first egress node and reroute packets to be sent to the first egress node via the backup LSP to the second egress node when a failure in the first egress node is detected.

Selecting a backup ingress node for the first ingress node 211 and a backup egress node for any of the first egress nodes may provide end-to-end protection in a P2MP LSP. By using the backup ingress and egress nodes, the end-to-end P2MP LSP protection may be localized to the initially configured (or primary) ingress and egress nodes of the P2MP LSP. This localized protection may provide more efficient protection to the edge nodes in comparison to using a second backup P2MP LSP from a second ingress node to all second egress nodes when an ingress or egress node fails (as in the label switched system 100). For instance, creating a backup sub-tree for the P2MP LSP from the backup ingress to the next-hop nodes of the first ingress node of the P2MP LSP and a backup LSP from the previous-hop of an egress node to a second backup egress node may require fewer network resources, e.g., in terms of reserved bandwidth, than creating a second backup P2MP LSP from the second ingress node to all the second egress nodes. Additionally, rerouting the traffic locally via the backup nodes and backup sub-tree for the P2MP or backup LSPs in the case of node failure may be faster and simpler to implement than routing traffic along the second backup P2MP LSP.

In an embodiment, the backup ingress node and the backup sub-tree for the P2MP LSP may be computed (by the first PCE 275 and the second PCE 277) using a plurality of constraints. The constraints may include that the selected backup ingress node is directly connected to the primary ingress node (e.g., the first ingress node 211) of the P2MP LSP. Further, the selected backup ingress node may not belong to the established P2MP LSP, e.g., may not be on the paths of the P2MP LSP. The constraints may also include that there is path (via one or more internal nodes of the label switched network 101) from the backup ingress node to the next-hop nodes of the primary ingress node of the P2MP LSP. Having a path from the source node 205 to the backup ingress node may also be another constraint. Since the second ingress node 212 satisfy the constraints above, the second ingress node 212 may be selected as the backup ingress node for the primary ingress node of the P2MP LSP (the first ingress node 211). Further, the backup ingress node that is selected may have an overall minimum cost path, including the path between the source node 205 and the backup ingress node and the backup sub-tree for the P2MP LSP between the backup ingress node and the next-hop nodes of the primary ingress node. For instance, the minimum cost path may have the minimum number of links (the shortest path) and/or the minimum needed resources (e.g., in term of bandwidth).

In a first scheme for selecting the backup ingress node and computing a backup sub-tree for the P2MP LSP in the label switched system 200, the first PCE 275 may find every node satisfying the constraints for a backup ingress node and add the node in a first list C1 for pre-candidate backup ingress nodes. The constraints may include that the node is an edge node directly connected to the primary ingress node (the first ingress node 211) and is not part of the existing P2MP LSP. Next, the first PCE 275 may find a path from each node N in C1 to the next-hop nodes of the primary ingress node to satisfy another one of the constraints. As shown in FIG. 2, the first ingress node 211 may have two next-hop nodes, the internal nodes 231 and 233, labeled N1 and N2 respectively. The first PCE 275 may add each node N that has a path to the next-hop nodes of the primary ingress node (e.g., N1 and N2) in a second list C2 for candidate backup ingress nodes.

The first PCE 275 may then send C2 to the second PCE 277. The second PCE 277 may find a path from the source node 205 to each candidate backup ingress node N in C2 if available to satisfy yet another one of the constraints. The second PCE 277 may add each node N that has a path from the source node 205 in a third list C3 for post-candidate backup ingress nodes and store the path of the node N, e.g., in the same or a corresponding list. The second PCE 277 may then send C3 to the first PCE 275. The first PCE 275 may then select for the backup ingress node (the node N in C3) through which there is a shortest or minimum cost path from the source node 205 to the next-hop nodes of the primary ingress node (N1 and N2).

In a second scheme for selecting the back ingress node and computing a backup sub-tree for the P2MP LSP in the label switched system 200, the first PCE 275 may send information about the primary ingress node, the next-hop nodes of the primary ingress node, the P2MP LSP, constraints for the backup ingress node, or combinations thereof to the second PCE 277. The second PCE 277 may find a path from the source node 205 to each edge node N of the domain of the primary ingress node (the label switched network 201) satisfying the constraints for the backup ingress node described above. The second PCE 277 may use the information received from the first PCE 275 to determine the edge nodes of the domain of the primary ingress node. The second PCE 277 may add each node N that has a path from the source node 205 in a list C4 and store the path of the node N, e.g., in the same or a corresponding list.

The second PCE 277 may then send C4 to the first PCE 275. The first PCE 275 may then find a path from each node N in C4 to the next-hop nodes of the primary ingress node (N1 and N2) to satisfy another one of the constraints. The first PCE 275 may add each node N that has a path to the next-hop nodes to another list C5. The first PCE 275 may then select for the backup ingress node the node N in C5 that has a shortest or minimum cost path from the source node 205 to the next-hop nodes of the primary ingress node (N1 and N2) through the node N.

Figure 3:
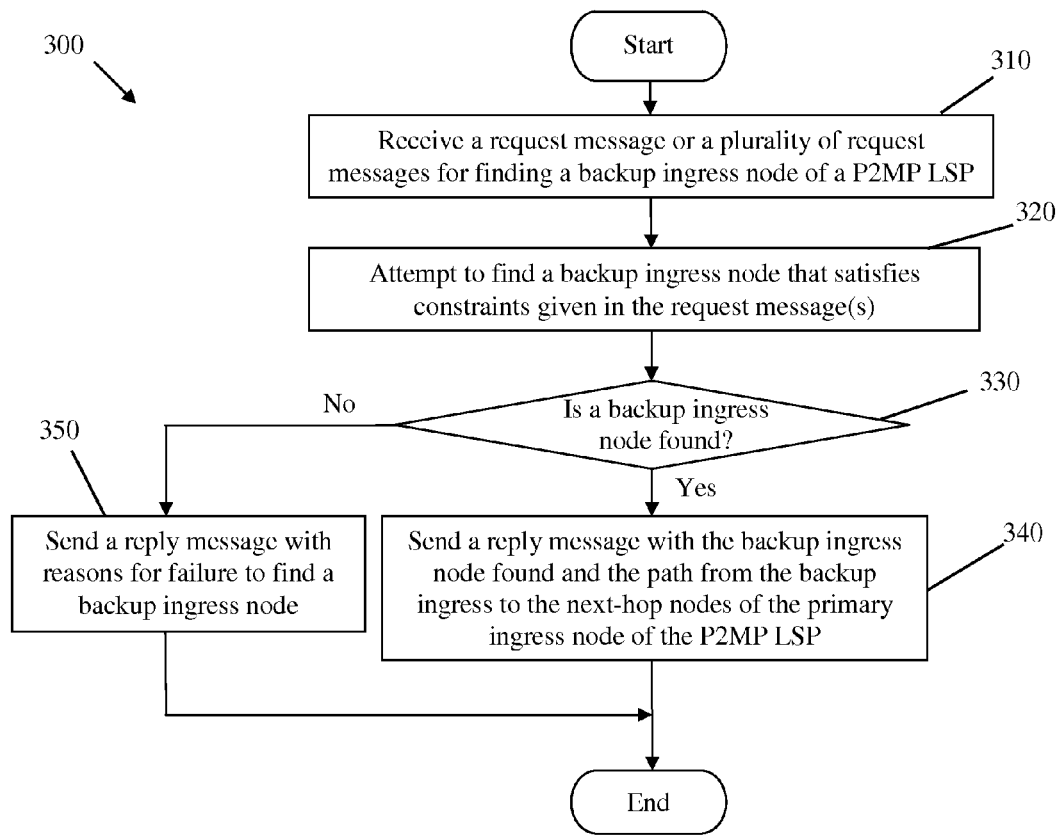
FIG. 3 is an illustration of one embodiment of a method for finding a backup ingress node for a P2MP LSP.

FIG. 3 illustrates an embodiment of a method 300 for finding a backup ingress node. The method 300 may be implemented as part of the first scheme or the second scheme above, for instance by the first PCE 275. The method 300 may begin at block 310, where a request message or a plurality of request messages for finding a backup ingress node for a P2MP LSP may be received. Using the label switched system 200 in FIG. 2 as an example, the first PCE 275 may receive a request message from one or more PCCs (e.g., PCC 271) to find a backup ingress node for the first ingress node 211 of the P2MP LSP. At block 320, an attempt may be made to find a backup ingress node that satisfies constraints given in the request message(s). The selection of the candidate backup ingress nodes may begin at the first PCE 275 as in the first scheme above or at the second PCE 277 as in the second scheme above. The constraints may be similar to the constraints described above. At block 330, the method 300 may determine whether a backup ingress node was found. For example, the second ingress node 212 may be found that meets the constraints described above. If the condition of block 330 is true, then the method 300 may proceed to block 340. Otherwise, the method 300 may proceed to block 350. At block 340, a reply message may be sent with the backup ingress node found and the path from the backup ingress node to the next-hop nodes of the primary ingress node of the P2MP LSP. For example, the reply indicating the second ingress node 212 and the computed sub-tree of the P2MP may be sent to the PCC 271. The method 300 may then end. At block 350, a reply message may be sent with reasons for failure to find a backup ingress node. For example, the reply message may indicate that no backup ingress node that meets the constraints could be found. The method 300 may then end.

Figure 4:
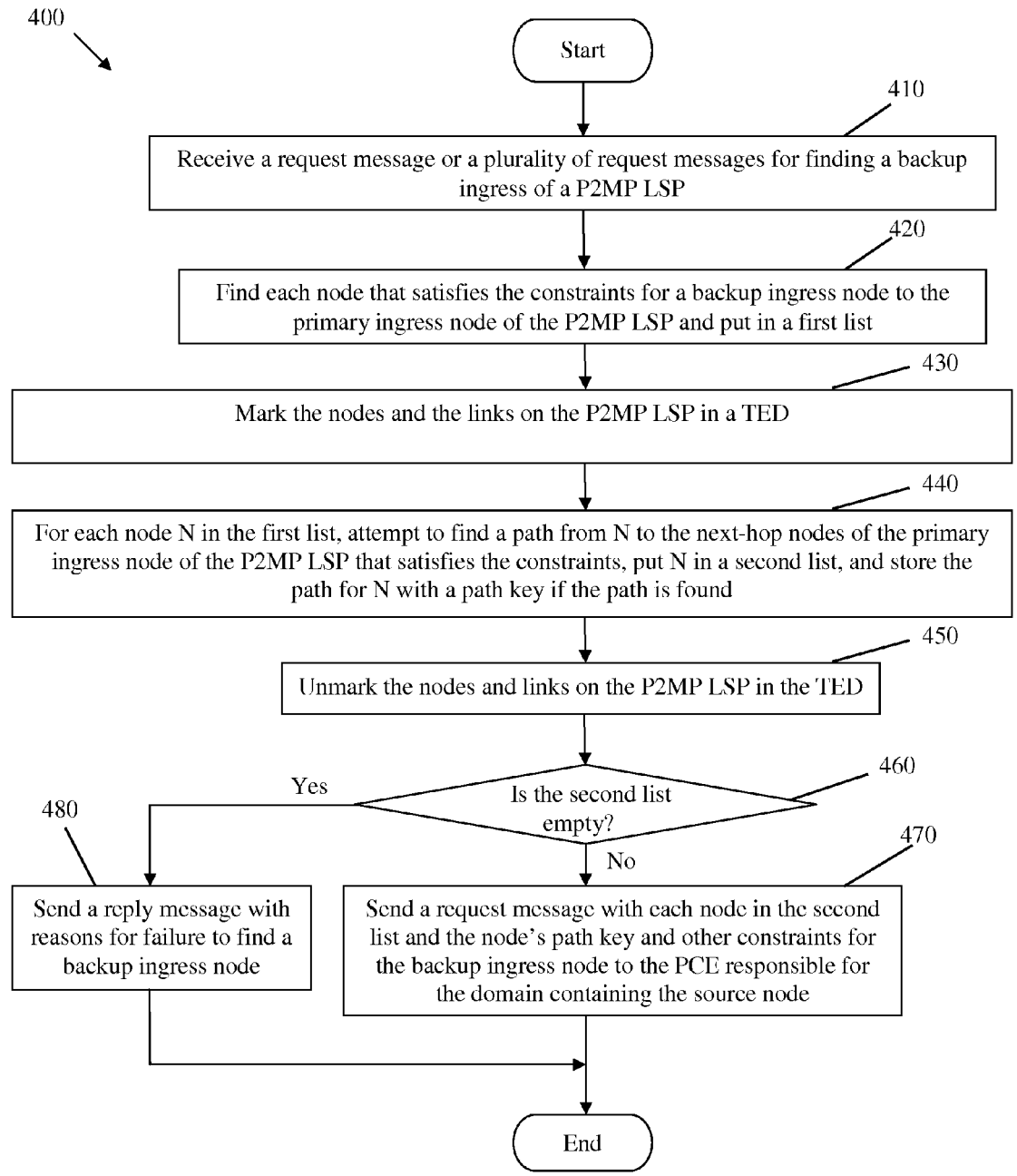
FIG. 4 is an illustration of one embodiment of a method on a PCE for finding a list of candidate backup ingress nodes.

FIG. 4 illustrates an embodiment of a method 400 for finding a list of candidate backup ingress nodes. The method 400 may be implemented as part of the first scheme above, for instance by the first PCE 275. The method 400 may begin at block 410, where a request message or a plurality of request messages for finding a backup ingress node for a P2MP LSP may be received. For example, the first PCE 275 may receive a request message from one or more PCCs (e.g., PCC 271) to find a backup ingress node for the first ingress node 211 of the P2MP LSP. At block 420, each node that satisfies the constraints for a backup ingress node to the primary ingress node of the P2MP LSP may be found and put in a first list. For example, the first PCE 275 may find each node satisfying the constraints for a backup ingress node and add the node in C1. The constraints may include that the node is an edge node directly connected to the primary ingress node (the first ingress node 211) and is not part of the existing P2MP LSP.

At block 430, the nodes and the links on the P2MP LSP may be marked in a TED or a database used by the computing PCE. At block 440, an attempt may be made to find a path from each node N in the first list to the next-hop nodes of the primary ingress node of the P2MP LSP that satisfies the constraints. The node N may be put in a second list and the path for the node N may be stored with a path key if the path is found. For example, the first PCE 275 may put in C2 all the nodes in C1 that have such paths. At block 450, the nodes and links on the P2MP LSP may be unmarked in the TED. At block 460, the method 400 may determine whether the second list is empty. If the condition in block 460 is true, i.e., no candidate backup ingress nodes can be found, then the method 400 may proceed to block 480. Otherwise, the method 400 may proceed to block 470. At block 470, a request message may be sent with each node in the second list and the node's path key and other constraints for the backup ingress node to the PCE responsible for the domain containing the source node. For example, the first PCE 275 may send C2 with the path information (or key to access path information) for the nodes in C2 and the constraints to the second PCE 277. The method 400 may then end. At block 480, a reply message may be sent with reasons for failure to find a backup ingress node. For example, the first PCE 275 may send a reply that no backup ingress node that meets the constraints could be found to the requesting PCC 271. The method 400 may then end.

Figure 5:
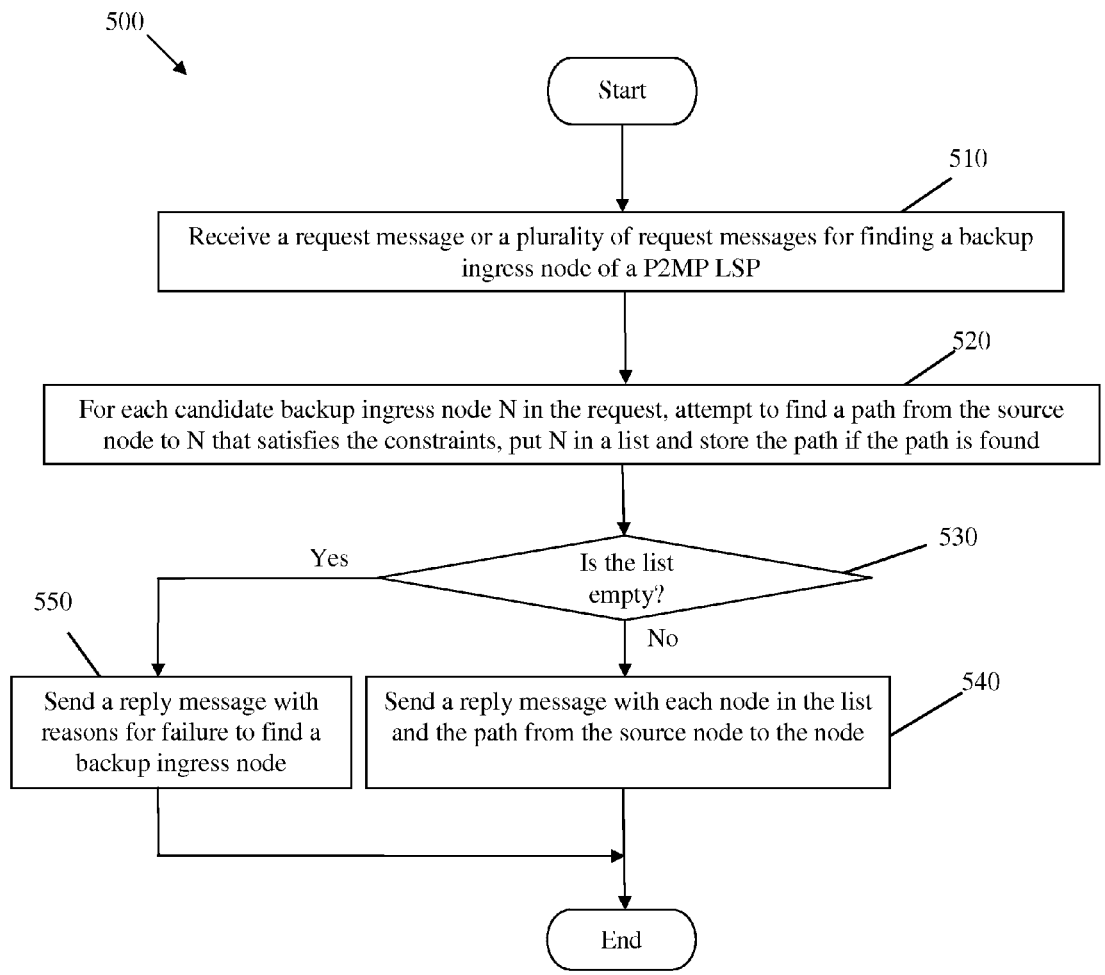
FIG. 5 is an illustration of one embodiment of a method on a PCE for finding a path from a source node to a candidate backup ingress node.

FIG. 5 illustrates an embodiment of a method 500 for finding a path from a source node to a candidate backup ingress node. The source node may be located in a separate domain than the P2MP LSP, such as the source node 205. The method 500 may be implemented as part of the first scheme above, for instance by the second PCE 277. The method 500 may begin at block 510, where a request message or a plurality of request messages for finding a backup ingress node for a P2MP LSP may be received. For example, the second PCE 277 may receive a request message from the first PCE 275 as part of the computation and selection procedure for the backup ingress node. The request message may comprise C2, constraints, and path information for the nodes in C2. At block 520, an attempt may be made to find for each candidate backup ingress node N in the request a path from the source node to the node N that satisfies the constraints. The node N may be put in a list and the path may be stored (in a list, file, or database) if the path is found. For example, the second PCE 277 may put the nodes in C3 that have such paths.

At block 530, the method 500 may determine whether the list is empty. If the condition in block 530 is true, i.e., no candidate backup ingress nodes can be found, then the method 500 may proceed to block 550. Otherwise, the method 500 may proceed to block 540. At block 540, a reply message may be sent with each node in the list and the path key from the source node to the node. For example, the second PCE 277 may send C3 and the calculated path information for the nodes in C3 to the first PCE 275. The method 500 may then end. At block 550, a reply message may be sent with reasons for failure to find a backup ingress node. For example, the second PCE 277 may send to the requesting first PCE 275 a reply that no candidate backup ingress node that have a path from the source node could be found. The method 500 may then end.

Figure 6:
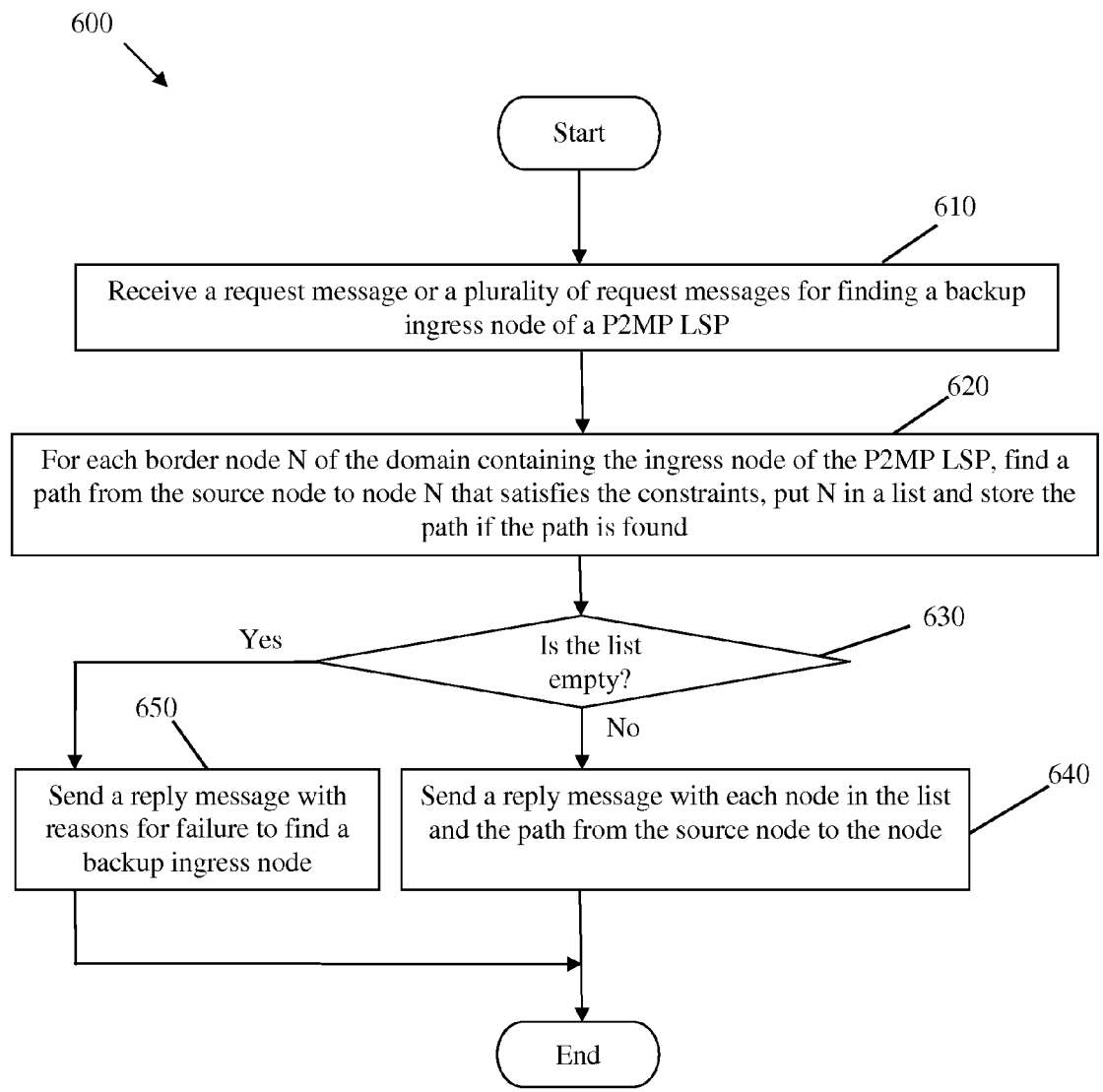
FIG. 6 an illustration of another embodiment of a method on a PCE for finding a list of candidate backup ingress nodes.

FIG. 6 illustrates an embodiment of a method 600 for finding a list of candidate backup ingress nodes. The source node may be located in a separate domain than the P2MP LSP, such as the source node 205 in label switched system 200 as an example. The method 600 may be implemented as part of the second scheme above, for instance by the second PCE 277. The method 600 may begin at block 610, where a request message or a plurality of request messages for finding a backup ingress node for a P2MP LSP may be received. For example, the second PCE 277 may receive a request message from the first PCE 275 as part of the computation and selection procedure for the backup ingress node. The request message may comprise constraints information for the backup ingress node. At block 620, an attempt may be made to find for each border node N of the domain containing the ingress node of the P2MP a path from the source node to the node N that satisfies the constraints. The node N may be put in a list and the path may be stored (in a list, file, or database) if the path is found. For example, the second PCE 277 may put the nodes in C4 that have such paths.

At block 630, the method 600 may determine whether the list is empty. If the condition in block 630 is true, i.e., no candidate backup ingress nodes can be found, then the method 600 may proceed to block 650. Otherwise, the method 600 may proceed to block 640. At block 640, a reply message may be sent with each node in the list and the path from the source node to the node. For example, the second PCE 277 may send C4 and the calculated path information for the nodes in C4 to the first PCE 275. The method 600 may then end. At block 650, a reply message may be sent with reasons for failure to find a backup ingress node. For example, the second PCE 277 may send to the requesting first PCE 275 a reply that no candidate backup ingress node that have a path from the source node could be found. The method 600 may then end.

Figure 7:
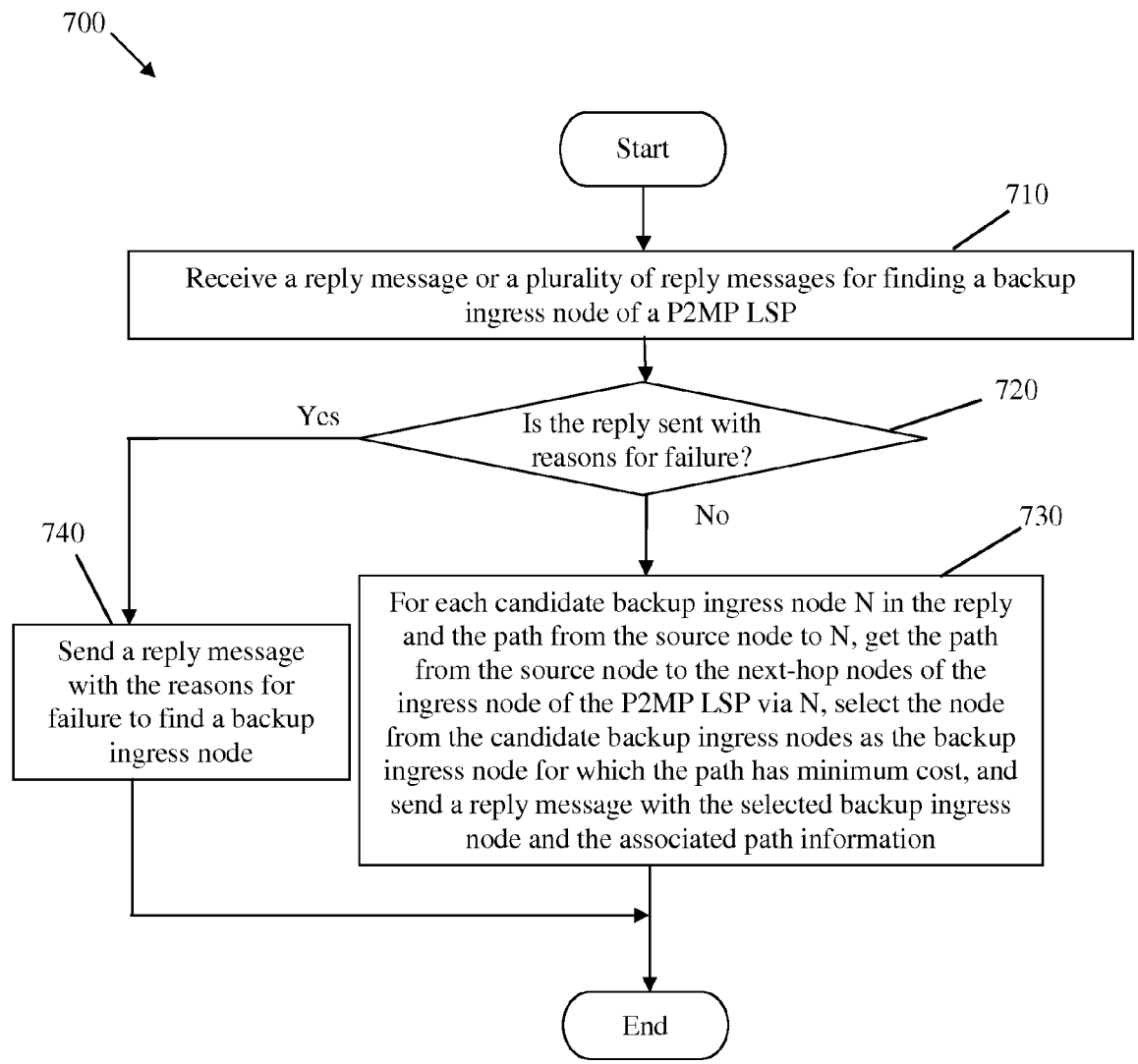
FIG. 7 is an illustration of one embodiment of a method on a PCE for selecting a backup ingress node from a list of candidate backup ingress nodes.

FIG. 7 illustrates an embodiment of a method 700 for selecting a backup ingress node from a list of candidate backup ingress nodes. The method 700 may be implemented as part of the first scheme or the second scheme above, for instance by the first PCE 275 in label switched system 200 as an example. The method 700 may begin at block 710, where a reply message or a plurality of reply messages for finding a backup ingress node for a P2MP LSP may be received. For example, the first PCE 275 may receive one or more reply messages from the second PCE 277 to find a backup ingress node. At block 720, the method 700 may determine whether the reply is sent with reasons for failure. If the condition in block 720 is true, i.e., no candidate backup ingress nodes can be found, then the method 700 may proceed to block 740. Otherwise, the method 700 may proceed to block 730.

At block 730, for each candidate backup ingress node N in the reply and the path from the source node to node N, a path may be calculated (if available) from the source node to the next-hop nodes of the ingress node of the P2MP LSP via node N. The node from the candidate backup ingress nodes for which the path has minimum cost may be selected as the backup ingress node, and a reply message may be sent with the selected backup ingress node and the associated path information. For example, in the first scheme, the first PCE 275 may select one of the candidate backup ingress nodes in the list C3 received from the second PCE 277. The selected backup ingress node (e.g., the second ingress node 212) may have the minimum cost (or shortest path) from the source node 205 to the next-hop nodes N1 and N2 through the backup ingress node (e.g., node 212). Alternatively, in the second scheme, the first PCE 275 may select one of the candidate backup ingress nodes in the list C5. The selected backup ingress node (e.g., the second ingress node 212) may have the minimum cost (or shortest path) from the source node 205 to the next-hop nodes N1 and N2. The method 700 may then end. At block 740, a reply message may be sent with reasons for failure to find a backup ingress node. For example, the first PCE 275 may send to the PCC 271 a reply that no candidate backup ingress node could be found that satisfies all the constraints. The method 700 may then end.

Figure 8:
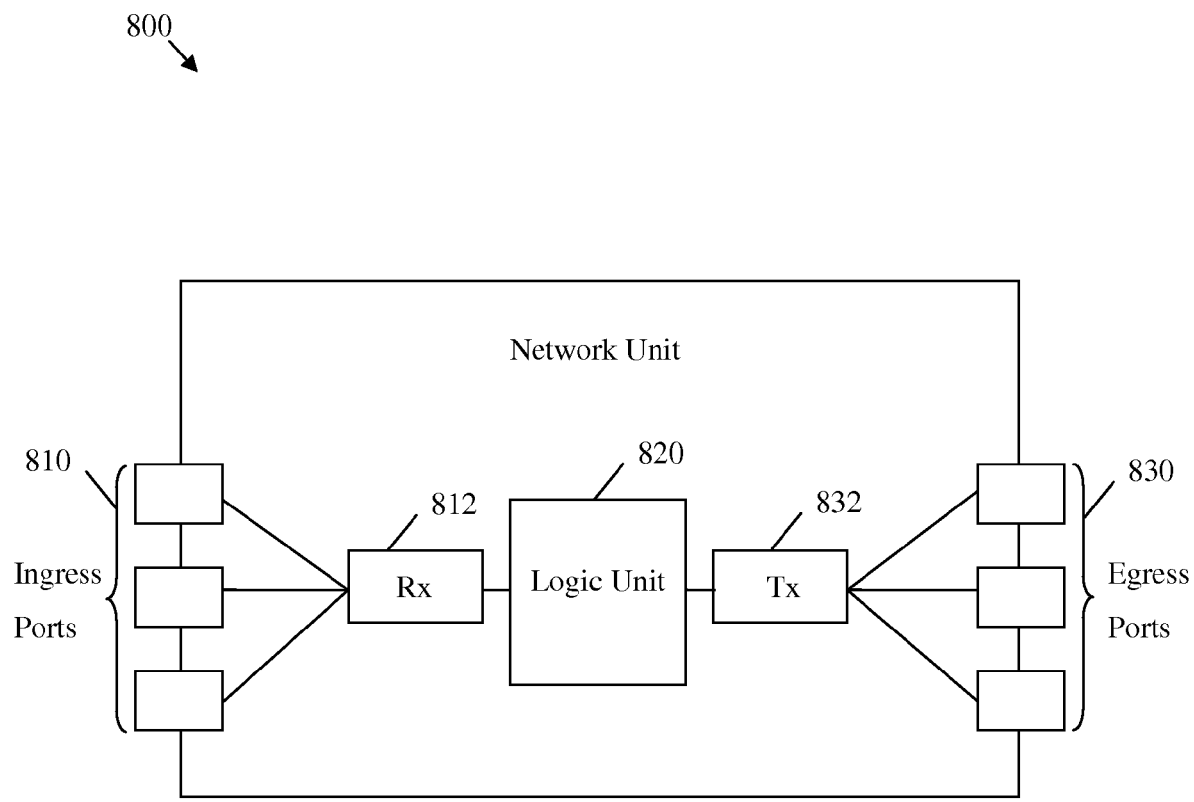
FIG. 8 is a schematic diagram of an embodiment of a network unit.

FIG. 8 illustrates an embodiment of a network unit 800, which may be any device that transports packets through a network. For instance, the network unit 800 may be located in any of the network components described above, e.g., in any one of the network nodes, the PCC, and/or the PCEs. The network unit 800 may comprise one or more ingress ports or units 810 coupled to a receiver (Rx) 812 for receiving signals and frames/data from other network components. The network unit 800 may comprise a logic unit 820 to determine which network components to send data to. The logic unit 820 may be implemented using hardware, software, or both. The network unit 800 may also comprise one or more egress ports or units 830 coupled to a transmitter (Tx) 832 for transmitting signals and frames/data to the other network components. The receiver 812, logic unit 820, and transmitter 832 may also implement or support any of the schemes and methods described above, such as any of the methods 300-700 and the corresponding two schemes described above. The components of the network unit 800 may be arranged as shown in FIG. 8.

Figure 9:
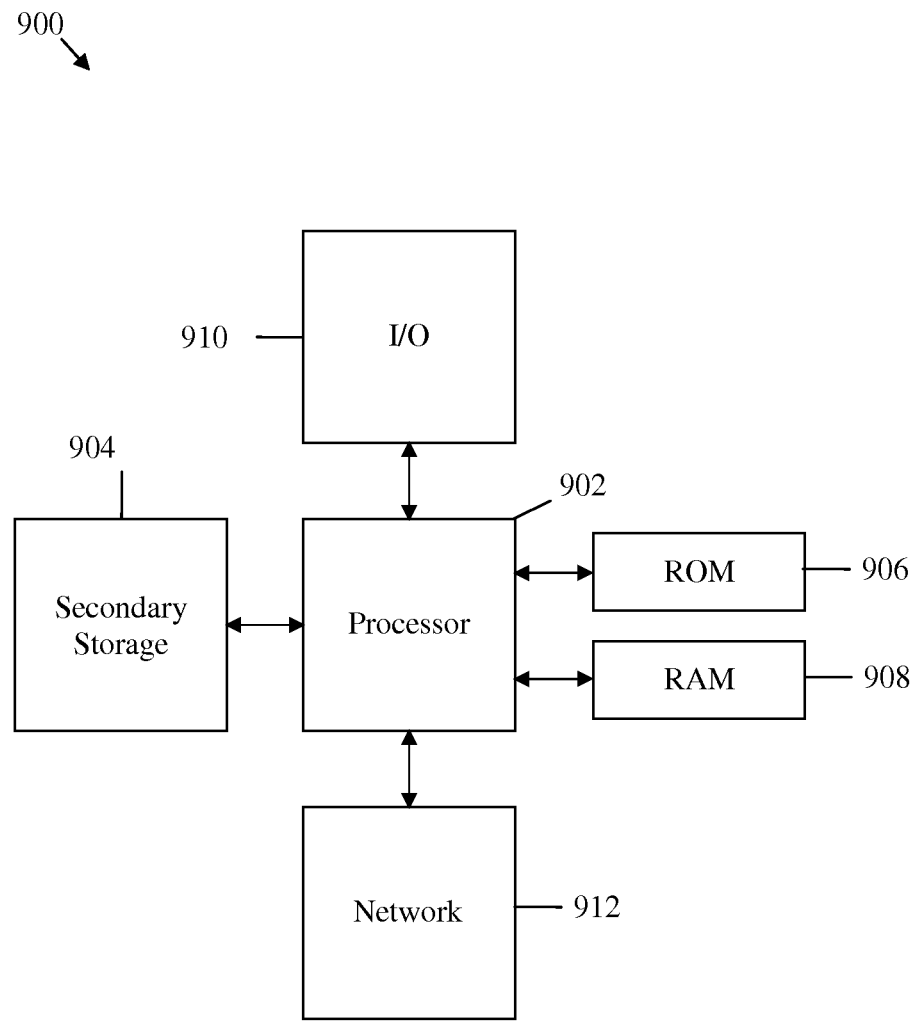
FIG. 9 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 9 illustrates a typical, general-purpose network component or node 900 suitable for implementing one or more embodiments of the components disclosed herein. The network component 900 includes a processor 902 (which may be referred to as a central processor unit or CPU) that is in communication with memory devices including secondary storage 904, read only memory (ROM) 906, random access memory (RAM) 908, input/output (I/O) devices 910, and network connectivity devices 912. Although illustrated as a single processor, the processor 902 is not so limited and may comprise multiple processors. The processor 902 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 902 may be configured to implement any of the schemes and methods described above, such as any of the methods 300-700 and the corresponding two schemes described above. The network component 900 may be a PCE or may implement functionality of a PCE.

The secondary storage 904 is typically comprised of one or more disk drives or tape drives and is used for non-volatile storage of data and as an over-flow data storage device if RAM 908 is not large enough to hold all working data. Secondary storage 904 may be used to store programs that are loaded into RAM 908 when such programs are selected for execution. The ROM 906 is used to store instructions and perhaps data that are read during program execution. ROM 906 is a non-volatile memory device that typically has a small memory capacity relative to the larger memory capacity of secondary storage 904. The RAM 908 is used to store volatile data and perhaps to store instructions. Access to both ROM 906 and RAM 908 is typically faster than to secondary storage 904.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a network component, the method comprising:

receiving a request from a second network component to find a backup ingress node for an ingress node of a point-to-multipoint (P2MP) label switched path (LSP);
determining a plurality of candidate backup ingress nodes that satisfy a plurality of constraints, including being an edge node in the ingress node's domain and having a direct link to the ingress node, a path to each next hop node of the ingress node of the P2MP LSP, and a path from a source node that communicates with the ingress node, wherein the determination is in response to receiving the request;
selecting the backup ingress node from the candidate backup ingress nodes that has a minimum cost of paths from the source node to the next hop nodes via the backup ingress node; and
sending a reply to the second network component that indicates the selected backup ingress node,
wherein each of the candidate backup ingress nodes has a path from the candidate backup ingress node to each of the next hop nodes of the ingress node of the P2MP LSP that is calculated by the network component, and wherein the network component is assigned to the same domain as the ingress node, and
wherein each of the candidate backup ingress nodes has a path from the source node that communicates with the ingress node of the P2MP LSP to the candidate backup ingress node that is calculated by a third network component assigned to the same domain as the source node.

2. The method of claim 1, wherein the constraints further include that the selected backup ingress node is not located on a path of the P2MP LSP.

3. The method of claim 1, wherein the reply also indicates a sub-tree for the P2MP LSP that comprises the paths from the backup ingress node to the next hop nodes of the ingress node.

4. The method of claim 3, wherein the constraints further include that the sub-tree does not include a link or a node of the P2MP LSP except for the next hop nodes of the ingress node of the P2MP LSP.

5. The method of claim 1, wherein the minimum cost of paths comprises a minimum number of links, a minimum total cost of the links or paths from the source node to the next hop nodes that uses a minimum bandwidth, or combinations thereof.

6. The method of claim 1 further comprising sending a reply to the second network component that indicates a failure to find a backup ingress node if a backup ingress node that meets the constraints is not found, wherein the reply indicates a reason for the failure.

7. The method of claim 1, wherein the network component comprises a path computation element (PCE), wherein the method is implemented by the PCE, wherein the third network component comprises a second PCE, and wherein the second PCE and the PCE jointly calculates the candidate backup ingress nodes.

8. A method implemented by a network component, the method comprising:
receiving a request from a path computation client (PCC) to find a backup ingress node for an ingress node of a point-to-multipoint (P2MP) label switched path (LSP);
determining a plurality of candidate backup ingress nodes that are edge nodes directly coupled to the ingress node and that each has a plurality of paths to a plurality of next hop nodes of the ingress node of the P2MP LSP;
sending the candidate backup ingress nodes to a second network component;
receiving a subset of the candidate backup ingress nodes from the second network component to each of which there is a path from a source node that communicates with the ingress node;
selecting the backup ingress node from the subset of candidate backup ingress nodes that has a minimum cost of paths from the source node to the next hop nodes via the backup ingress node; and
sending a reply to the PCC that indicates the selected backup ingress node.

9. The method of claim 8 further comprising:
adding each edge node directly coupled to the ingress node in a first domain of the ingress node and that does not belong to the P2MP LSP to a first list for pre-candidate backup ingress nodes; and
adding each node from the first list that has a path outside the P2MP LSP to each of the next hop nodes to a second list for candidate backup ingress nodes;
storing the path to each of the next hop nodes for each node; and
sending the second list with a key to each stored path to the second network component in a second domain of the source node.

10. The method of claim 9 further comprising sending constraints for finding the backup ingress node with the second list to the second network component.

11. The method of claim 9 further comprising:
marking each node and link of the P2MP LSP in a traffic engineering databases (TED) before obtaining the second list; and
unmarking each node and link that was marked in the TED before sending the second list to the second network component.

12. The method of claim 9 further comprising sending a reply to the PCC that indicates a failure to find a backup ingress node if the second list is empty, wherein the reply indicates a reason for the failure.

13. The method of claim 8, wherein the network component comprises a path computation element (PCE), wherein the method is implemented by the PCE, wherein the second network component comprises a second PCE, and wherein the second PCE and the PCE jointly calculate the candidate backup ingress nodes.

14. An apparatus comprising:
a path computation element (PCE) configured to:
receive a request from a path computation client (PCC) to find a backup ingress node for an ingress node of a point-to-multipoint (P2MP) label switched path (LSP);
find a plurality of candidate backup ingress nodes that are edge nodes directly coupled to the ingress node and that each has a plurality of paths to a plurality of next hop nodes of the ingress node of the P2MP LSP;
send the candidate backup ingress nodes to a second PCE;
receive a subset of the candidate backup ingress nodes from the second PCE to each of which there is a path from a source node that communicates with the ingress node;
select the backup ingress node from the subset of candidate backup ingress nodes that has a minimum cost of paths from the source node to the next hop nodes via the backup ingress node; and
send a reply to the PCC that indicates the selected backup ingress node.

15. The apparatus of claim 14, wherein the PCE is assigned to a first domain that comprises the ingress node of the P2MP LSP, and wherein the second PCE is assigned to a second domain that comprises the source node.

16. A method implemented by a path computation element (PCE) in a network, the method comprising:
- receiving a request from a second PCE to find a backup ingress node for an ingress node of a point-to-multipoint (P2MP) label switched path (LSP), wherein the request comprises information about the P2MP LSP, the ingress node, and constraints for finding the backup ingress node;
- finding a plurality of candidate backup ingress nodes that are edge nodes of a first domain of the ingress node and to each of the edge nodes there is a path from a source node that communicates with the ingress node in a second domain; and
- sending the candidate backup ingress nodes to the second PCE,
- wherein the second PCE selects a subset of the candidate backup ingress nodes that each is directly connected to the ingress node of the P2MP LSP and has a path to each of a plurality of next hop nodes of the ingress node of the P2MP LSP, and subsequently selects the backup ingress node from the subset of candidate backup ingress nodes that has a minimum cost of paths from the source node to the next hop nodes via the backup ingress node.

17. The method of claim 16 further comprising sending a reply to the second PCE that indicates a failure to find a backup ingress node, wherein the reply indicates a reason for the failure.

* * * * *

UNITED STATES PATENT AND TRADEMARK OFFICE
CERTIFICATE OF CORRECTION

PATENT NO.       : 8,908,501 B2                                        Page 1 of 1
APPLICATION NO.  : 13/549234
DATED            : December 9, 2014
INVENTOR(S)      : Huaimo Chen It is certified that error appears in the above-identified patent and that said Letters Patent is hereby corrected as shown below:

On the Title Page:
Item (74) Attorney, Agent, or Firm - Delete "Conley Rose, P.C.; Gary Rodolph; William H. Dietrich" and insert -- Conley Rose, P.C.; Grant Rodolph; William H. Dietrich --

Signed and Sealed this
Fifth Day of May, 2015

Michelle K. Lee
*Director of the United States Patent and Trademark Office*